United States Patent [19]
Omata et al.

[11] Patent Number: 5,982,979
[45] Date of Patent: *Nov. 9, 1999

[54] VIDEO RETRIEVING METHOD AND APPARATUS

[75] Inventors: Mitsuteru Omata, Hadano; Kazuaki Tanaka, Yokohama; Hiroshi Taguchi; Yasuyuki Ooki, both of Hadano; Manabu Takano, Ebina, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,183

[22] Filed: Mar. 12, 1996

[30] Foreign Application Priority Data

Mar. 13, 1995 [JP] Japan .................................. 7-052256

[51] Int. Cl.⁶ ..................................................... H04S 5/91
[52] U.S. Cl. ............................... 386/69; 386/52; 348/563
[58] Field of Search .................................. 358/335, 342; 360/69; 369/32, 48, 56, 57; 386/6–8, 45, 69–70, 81, 82, 95, 108, 125–126, 52; 348/10, 563–565; H04N 5/51

[56] References Cited

U.S. PATENT DOCUMENTS

| | | | |
|---|---|---|---|
| 4,717,971 | 1/1988 | Sawyer ..................................... | 358/342 |
| 5,157,511 | 10/1992 | Kawai et al. ........................... | 358/335 |
| 5,237,648 | 8/1993 | Mills et al. ............................. | 395/133 |
| 5,261,048 | 11/1993 | Matsumoto et al. .................... | 395/164 |
| 5,262,877 | 11/1993 | Otsuka .................................... | 358/343 |
| 5,404,316 | 4/1995 | Klingler et al. ........................ | 364/514 |
| 5,499,103 | 3/1996 | Mankovitz .............................. | 358/335 |
| 5,523,796 | 6/1996 | Marshall et al. ........................ | 348/589 |
| 5,613,032 | 3/1997 | Cruz et al. .............................. | 386/69 |

FOREIGN PATENT DOCUMENTS

| | | | |
|---|---|---|---|
| 0472806 A2 | 8/1991 | European Pat. Off. ......... | H04N 5/14 |
| 0 545 727 A2 | 4/1992 | European Pat. Off. ........ | G11B 27/32 |

OTHER PUBLICATIONS

Tonomura et al., Content Oriented Visual Interface Using Video Icons for Visual Database Systems, Journal of Languages and Computing(1990), pp. 183–198, 1990.

Cruz et al., Capturing and Playing Multimedia Events with Streams, Multimedia 94, pp. 193–200, Oct. 1994.

Little et al., A Dig, On–Demand Video Service Supporting Content–Based Queries, ACM Mult. pp. 427–436, Aug. 1993.

Tonomura et al., VideoMap and VideoSpaceIcon: Tools for Anatimizing Video Content, Inerchi '93, Apr. 1993.

*Primary Examiner*—Wendy Garber
*Assistant Examiner*—Vincent F. Boccio
*Attorney, Agent, or Firm*—Fay, Sharpe, Beall, Fagan, Minnich & McKee

[57] ABSTRACT

The video retrieving method provides a video retrieval man-machine interface which visually specifies a desired video out of many stored videos by using previously linked picture data corresponding to the videos. Also, a video reproduction operating man-machine interface visually designates the position of reproduction out of the picture group indicative of the contents. The video retrieving method employs video data, character information linked to the video data, picture data linked to the videos, and time information corresponding to the picture data in the video data. The character information is composed of a title of each video and a creation date thereof. The picture data include, as retrieval information, one picture data representing the content of the relevant video (one picture expressing the video, i.e., a leaflet or the like), and a plurality of picture data adapted to grasp the contents of the entire video. The time information indicates the temporal position of the picture data in the video data.

15 Claims, 5 Drawing Sheets

VIDEO RETRIEVING METHOD AND APPARATUS

FIELD OF THE INVENTION

The present invention relates to a method and apparatus for the retrieval of videos which are stored as digital data.

BACKGROUND OF THE INVENTION

In retrieving stored videos, it is known to selectively obtain a desired video based on secondary information such as the title of the video, its creation date, the creator of the video and the amount of data in the video, by using character strings which are added to the videos. A desired video may be reached by using a fast-forward or rewind operation until a specific part is reached. However, when the number of videos that are stored is large in both number and quantity of data, this retrieval method is disadvantageous in that it requires a substantial amount of time to search for a desired video.

An example of a technique used for retrieval in a motion picture database is disclosed in Japanese Patent Publication No. HEI 6-101018 (1994). According to this example, a frame of a moving picture is divided into blocks on the basis of the motion of objects in the motion picture data. A specific object is retrieved from the motion picture data by using the calculated motion data as a retrieval index. However, still pictures included in the motion pictures are not used as a retrieval index.

SUMMARY OF THE INVENTION

It is an object of the present invention to provide an improved video retrieving method which overcomes the above described problems in the prior art and enables a user to specify a desired video at a desired position by displaying at least one item of picture data which is representative of the video with respect to the stored videos in the storage medium. Also, a plurality of picture data pertaining to the one video are displayed in order to grasp the content of the video. This is done for each video.

Another object of the present invention is directed to providing an improved method of operation which enables a user to perform retrieval of videos in a more precise manner.

In order to accomplish the above mentioned objects of the present invention, the method of retrieving videos includes the following steps: a step of providing a unique identifier to each of the retrievable videos to indicate a relevant video, and in accordance with the content of the video, registering the relevant video identifier in a storage unit; a step of registering, in the storage unit, one or more picture data representative of the video, a plurality of picture data indicative of the contents of each video, and temporal positions in the videos; a step of specifying, in response to a video retrieval request from a user, the sort of the video from retrieval character strings in the storage medium; a step of loading at least one or more of the first picture data from the storage medium and displaying the loaded data; a step of loading from the storage medium the second picture data corresponding to the first picture data designated by the user, and displaying the loaded data; and a step of loading from the storage medium the video data subsequent to the position in the video data corresponding to the second picture data designated by the user, and then displaying the loaded data.

Preferably, the present invention includes another step of extracting, as second picture data, still picture data that occurs immediately after a scene change in the video data.

By providing at least one still picture representative of the content of the video as well as a plurality of still pictures for grasping the contents of the video, it becomes possible to provide a video retrieving man-machine interface that is capable of visually specifying a desired video in the following manner. First, the number of stored videos are narrowed down to a desired video by first using character strings. Then, representative picture and digest images can be used as well as specific picture groups that signify the contents of a video.

It is also possible to provide a video reproduction operation man-machine interface which is capable of visually designating the position of reproduction to thereby realize enhanced efficiency. This is accomplished by selecting one picture out of a picture group that signifies the contents of the video. As mentioned earlier, second picture data preferably represents still picture data that is stored immediately after a scene change in the video data.

DETAILED DESCRIPTION OF THE PREFERRED EMBODIMENTS

Figure 1:
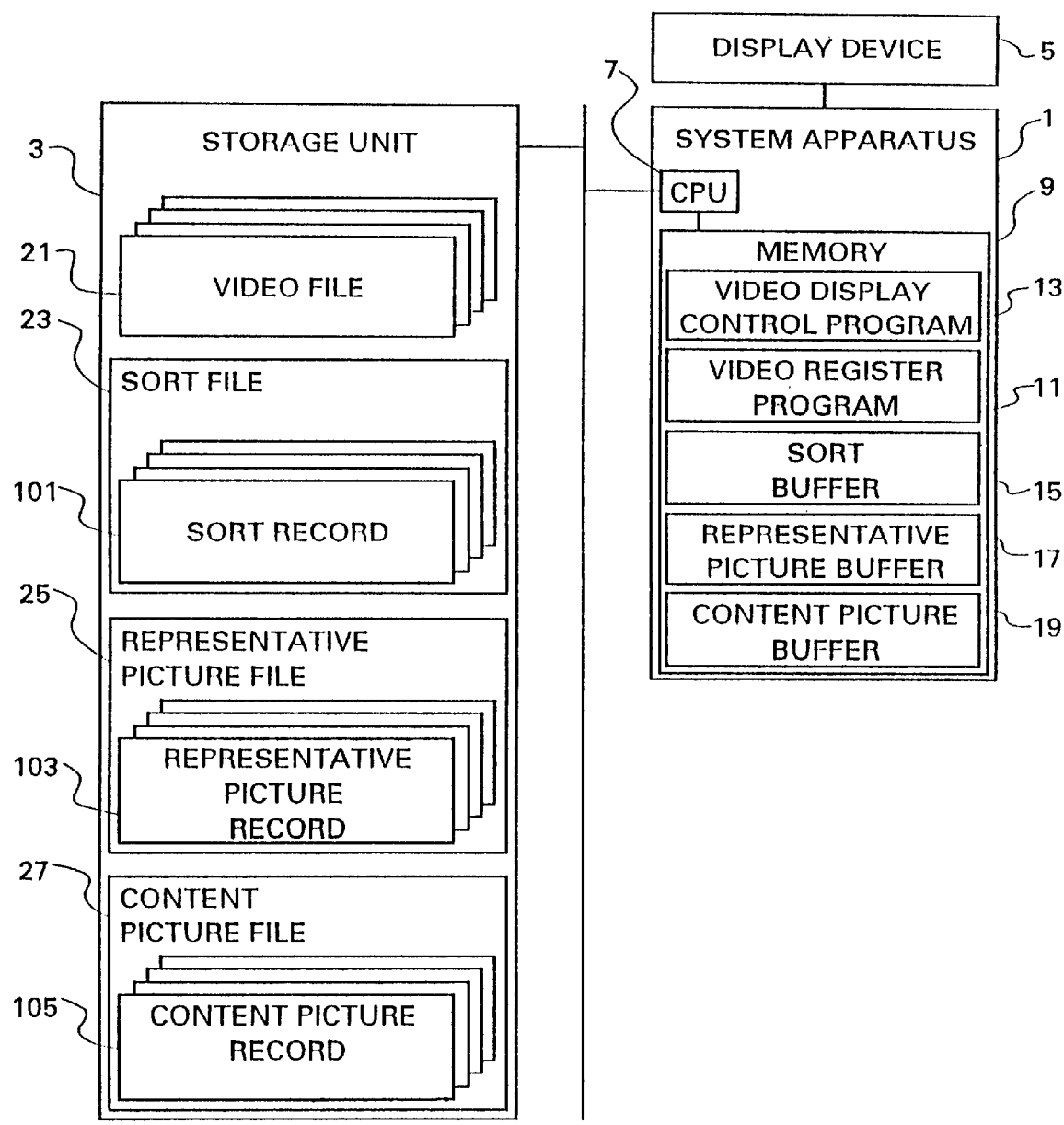
FIG. 1 is a block diagram of a system according to an embodiment of the present invention including a video register program and a video retrieval control program.

FIG. 1 is a block diagram showing an overall system according to an embodiment of the present invention. System apparatus 1 may be a work station (WS) or a personal computer (PC). Data storage unit 3 may be a magnetic disk device, and output unit 5 may be a display.

System apparatus 1 includes a central processing unit (CPU) 7 and a memory 9. Memory 9 includes a video register program 11 for registering video data and secondary data for retrieval into the data storage unit 3, a video display control program 13 for displaying the video, a sort buffer 15 for setting one or more categories in which to sort records, a representative picture buffer 17 for setting one or more representative picture records, and a content picture buffer 19 for setting one or more content picture records.

Storage unit 3 includes a plurality of video files 21, each including individual videos and being specified by a file identifier. Storage unit 3 also includes a sort file 23 storing sort records 101, a representative picture file 25 storing representative picture records 103, and a content picture file 27 storing content picture records 105.

Figure 2:
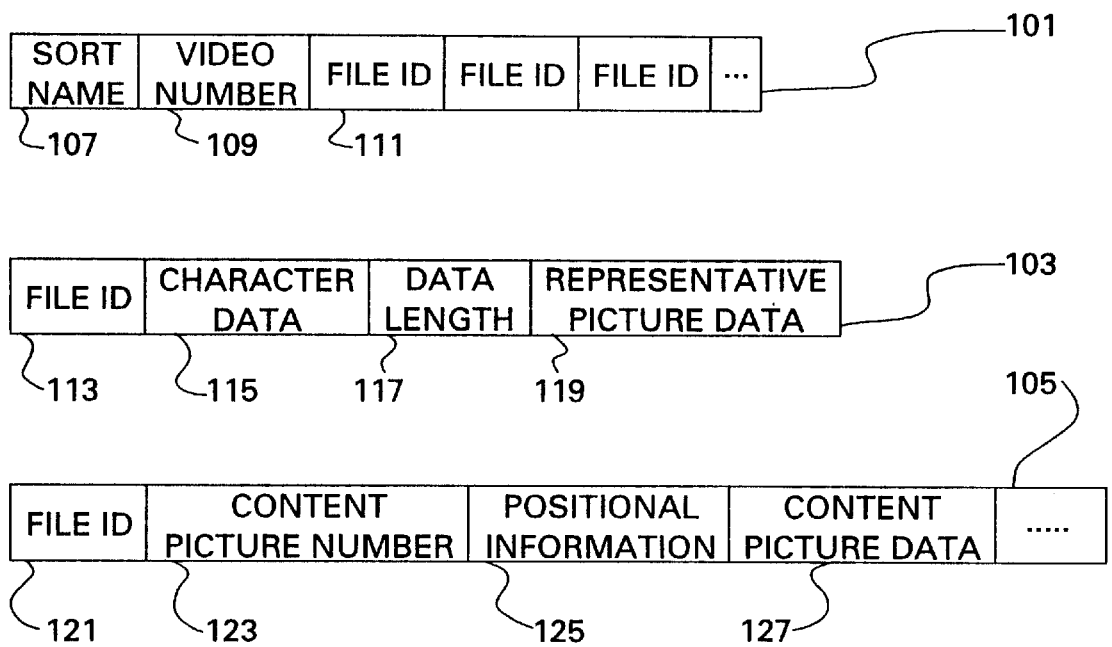
FIG. 2 illustrates the structure of management records required for controlling video registration and video display.

Sort records 101, representative picture records 103 and content picture records 105 will now be discussed in connection with FIG. 2. Each sort record 101 is composed of a sort name 107, a video number 109 belonging to the relevant sort, and a group of file IDs 111 specifying each of the videos. Sort records corresponding to the number of sorts are registered in sort file 23.

Representative picture record 103 is composed of a file ID 113 specifying the video, character data 115 which may be the title of the video and the date it was created, representative picture data 119, and a data length 117 of the representative picture data. The representative picture records 103 corresponding to the number of videos are registered in the representative picture file 25.

Each content picture record 105 is composed of a file ID 121 specifying the video, a content picture number 123, and positional information 125 such as a time code to specify the temporal position of the relevant content picture data 127 in the video data. The content picture records 105, which correspond to the number of videos, are registered in the content picture file 27.

In another embodiment of the present invention employing a representative picture record 103 and a content picture record 105, a method of registering the representative picture data 119 and the content picture data 127 in individual separate files may be adopted. Also, the file IDs, which specifies such files, may be registered in the representative picture record 103 and the content picture record 105. In a further embodiment, it is also possible to adopt a method of combining the representative picture record 103 and the content picture record 105 with each other to form a single record.

In FIG. 1, a description of input/output regions for the individual files and that of operating regions required for execution of programs are omitted to avoid complication.

Figure 3:
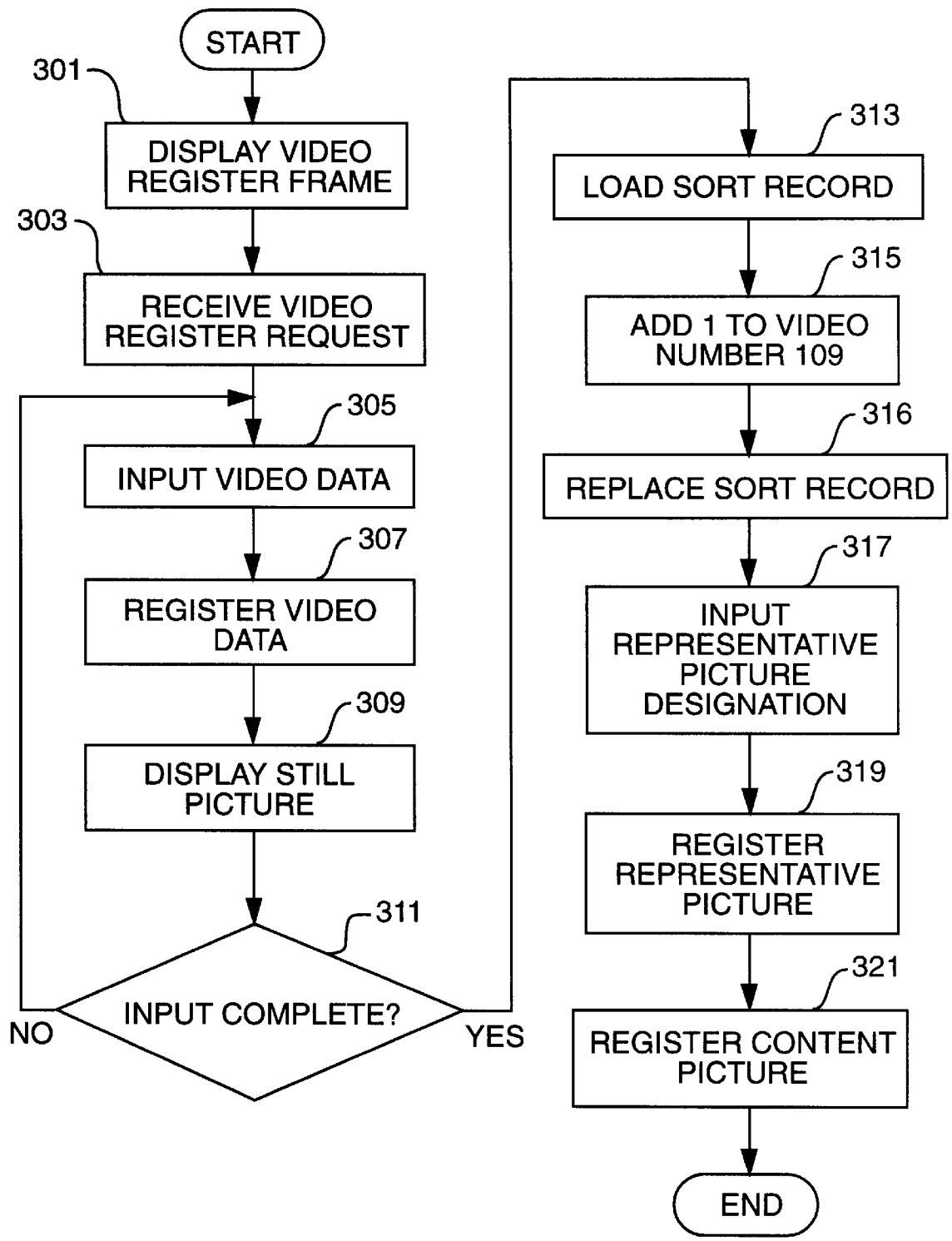
FIG. 3 is a flowchart for the execution of a video register program.

The processing operation of a video register program 11 will now be explained in detail in connection with the flow chart of FIG. 3. Upon starting of a video register program 11, a video register frame or picture is displayed on the display device 5 (step 301). On the basis of this video register picture, a user can input at least a file ID for designating a video file in which to register the video data, as well as character information such as a sort name, a title and a date of the video. In response to a video register request received from the user (step 303), video data is inputted from the video output unit (step 305).

The input video data is registered in a video file 21 of the data storage unit 3 in accordance with the file ID designated by the user (step 307). Then, still picture data included in the video data is sampled at a predetermined time interval and is displayed on the display device 5 (step 309). Next, a decision is made as to whether the video input has been completed or not (step 311). If the result of the decision at step 311 is No, the process is repeated from step 305. On the other hand, if the result of the decision at step 311 is Yes, the sort record 101 is loaded from the sort file 23 on the basis of the sort name designated by the user (step 313). Then, the file ID 111 specifying the relevant video-registered file is inserted into the sort record 101, and after addition of a numerical value 1 to the video number 109 (step 315), the sort record 101 in the sort file 23 is then replaced (step 316).

Subsequently, the information that specifies the representative picture designated by the user from the displayed still pictures is received (step 317), and then the representative picture date, the file ID and the character information, including the title etc., are registered in the representative picture file 25 (step 319). Finally, the file ID 121, the content picture data 127, the positional information 125, and the content picture number 123 are registered in the content picture file 27 (step 321).

In this embodiment, the still picture data is sampled at a predetermined time interval at step 309. However, this may be modified so that the user selects from the video a still picture that is to be used as a representative picture or a content picture. In another modification, a scene change point in the video can be automatically recognized and a still picture immediately after such a change is extracted, as disclosed in the thesis "IMPACT: AN INTERACTIVE NATURAL-MOTION-PICTURE DEDICATED MULTIMEDIA AUTHORING SYSTEM" described in ACM (The Association for Computing Machinery), Inter CHI91, pp. 343–350.

Figure 4:
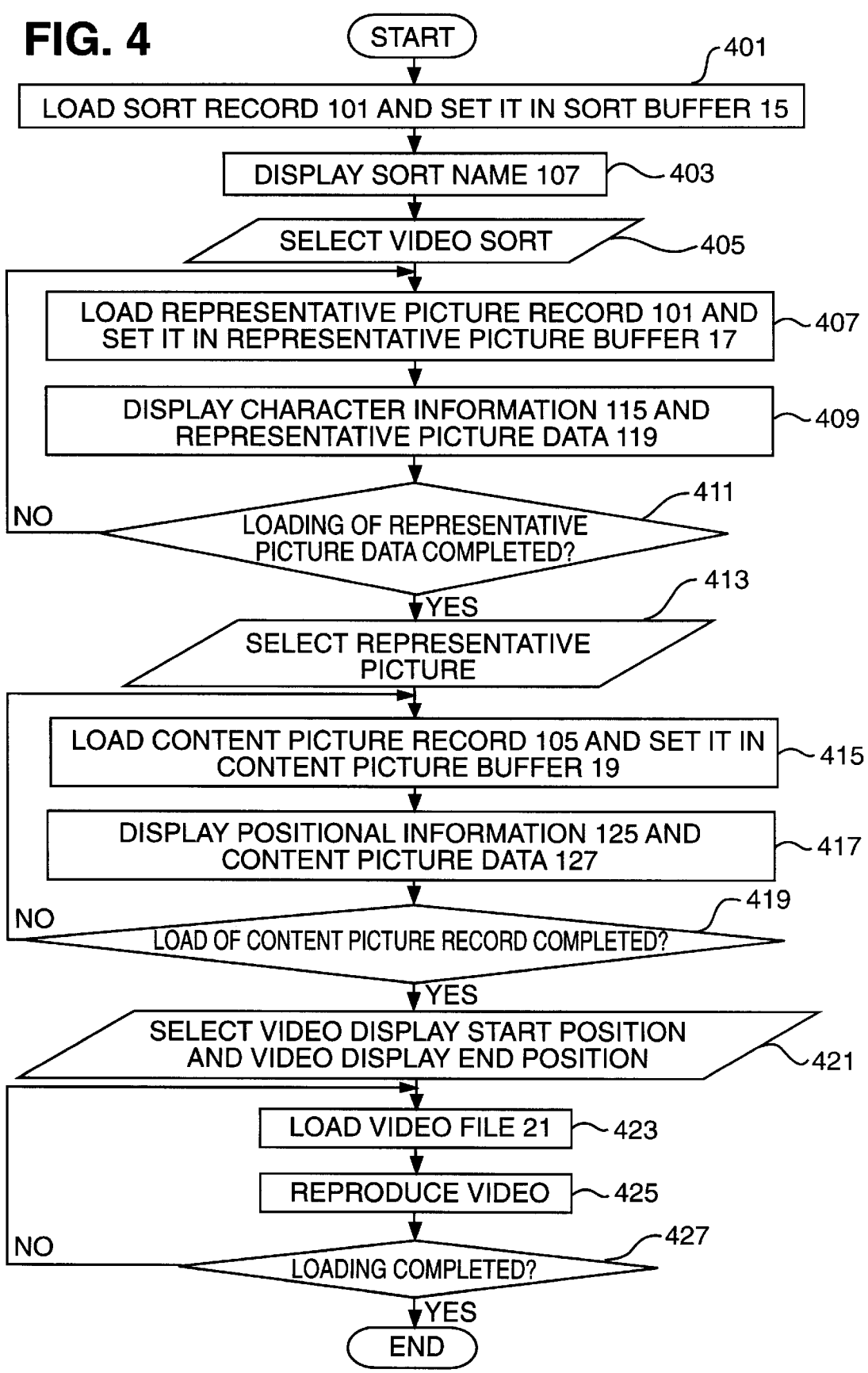
FIG. 4 is a flowchart for the execution of a video retrieval control program.
Figure 5:
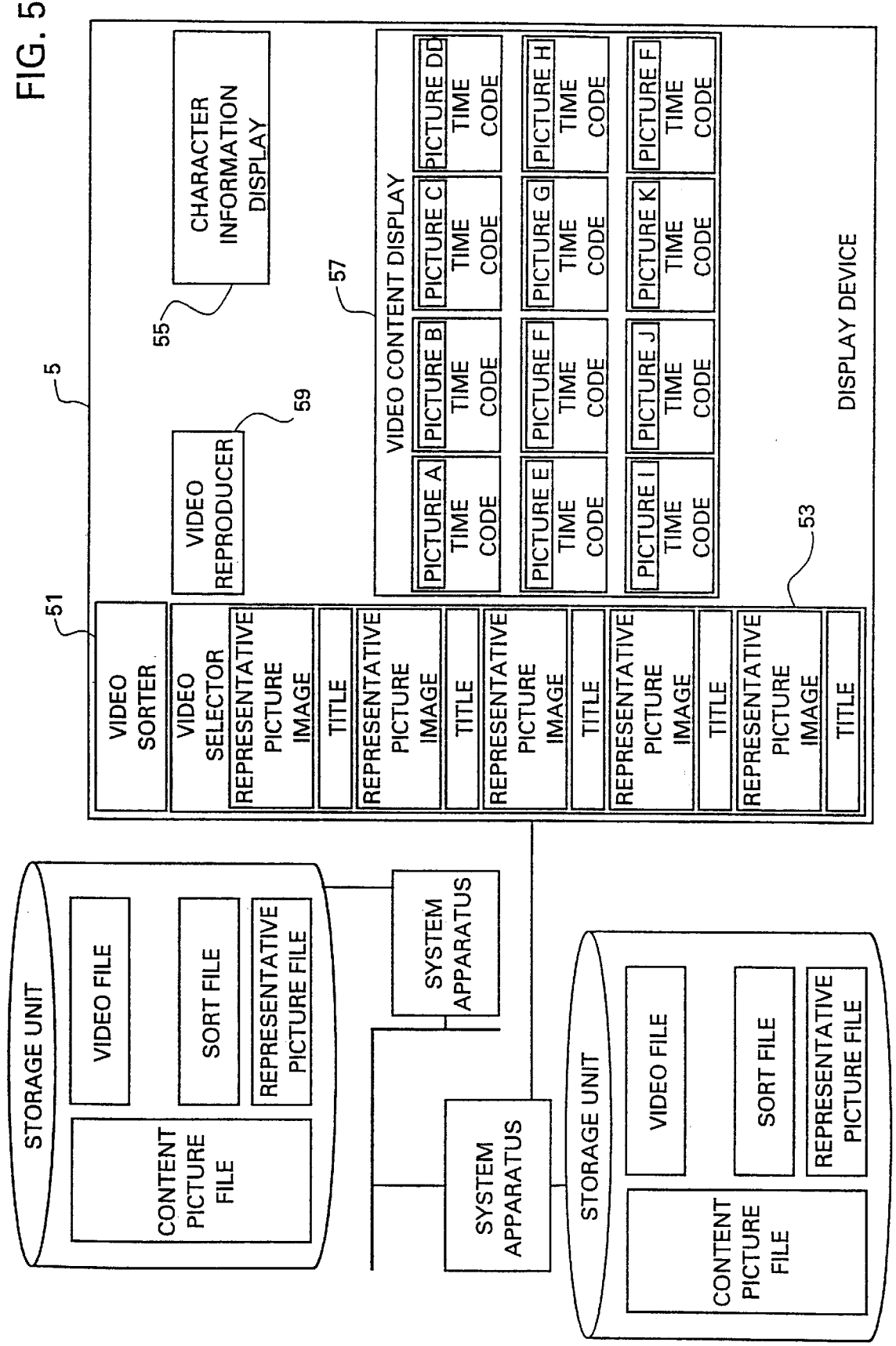
FIG. 5 is an example of the resulting output of the video retrieval control program as represented in an output unit according to an embodiment of the present invention.

FIG. 4 is a flow chart of a video retrieval control program 13 according to the present embodiment. FIG. 5 illustrates the resultant output of video retrieval control program 13.

As shown in FIG. 4, sort record 101 is first loaded from the sort file 23 stored in the storage unit 3 and is then set into sort buffer 15 (step 401). The sort name 107 in the sort record 101 is displayed in a video sorter 51 shown in FIG. 5 (step 403). A designation from the user regarding the sort of a desired video to be displayed is inputted from video sorter 51 (step 405).

The representative picture record 103 in the representative picture file 25 is loaded in accordance with the file ID 111 of the sort record 101 corresponding to the sort selected by the user and is then placed in the representative picture buffer 17 (step 407). The character information 115, such as the title and the representative picture data 119 in the representative picture record 103, is displayed on a video selector 53 and a character information display 55 (step 409).

A decision is then made as to whether or not the loading of the relevant representative picture record 103 has been completed (step 411). If the result of such decision at step 411 is No, the flow is repeated from step 407. On the other hand, if the result of the decision at step 411 is Yes, a designation from the user relative to selection of a desired video to be displayed is inputted from the video selector 53 (step 413). Consequently, the content picture file 27 corresponding to the video selected by the user is loaded and then is set in the content picture buffer 19 (step 415). The positional information 125 and the content picture data 127 included in the content picture record 105 are displayed on the video content display 57 (step 417).

A decision is then made as to whether or not the loading of the relevant content picture record 105 has been completed (step 419). If the result of such decision is No, the process flow is repeated from step 415. On the other hand, if the result of the decision at step 419 is Yes, a designation from the user regarding the display start position and the display end position of the desired video is inputted from the video content display 57 (step 421). Subsequently, the video file 21 is loaded in accordance with the video display start position selected by the user (step 423) and once the reproduction of the video file 21 is rendered ready, the video is reproduced in a video reproducer 59 (step 425).

Finally, a decision is made as to whether or not the loading of the video file 21 has been completed or not (step 427). If the result of such decision at step 427 is No, the process flow is repeated from step 423. On the other hand, if the result of the decision at step 427 is Yes, the video retrieval control program 13 is terminated.

According to the present invention, as described in detail hereinabove, retrieval keys to each of videos stored in a storage medium are formed of at least one still picture representing the relevant video, a plurality of still pictures provided for grasping the content of the video, and information indicating the temporal position of such content-grasping still pictures in the video, whereby the content of the video can be confirmed with enhanced facility in comparison with the conventional retrieval method based merely on character strings added to the video. Furthermore, the content of the video is displayed with one or more still pictures, and the position of reproduction can be designated by selecting one of such still pictures, thus achieving another advantageous effect that realizes desired retrieval without requiring the time for determination of the position of reproduction as required by the prior art.

Although the present invention has been described in connection with the preferred embodiments disclosed above, one of ordinary skill in the art would be enabled by this disclosure to make various modifications to the preferred embodiments and still be within the scope and spirit of the present invention as recited in the appended claims.

We claim:

1. In a system having a plurality of videos stored in a storage medium, a video retrieval method comprising the steps of:

storing first picture data representative of each of said plurality of videos;

storing a plurality of second still picture data using a portion of pictures composing each of the plurality of videos, each of said plurality of the second still picture data including positional information indicative of a position of a cache of said plurality of the second still picture data in each of said plurality of videos;

loading the first picture data from said storage medium and displaying the loaded first picture data, in response to a video retrieval request from a user;

based upon a selection of one of the displayed first picture data by the user, loading from said storage medium second still picture data corresponding to the one first picture data selected by the user, and displaying the loaded second still picture data;

displaying the loaded first picture data and the loaded second still picture data on one screen; and based upon a selection of one of the displayed second still picture data by the user, loading from said storage medium video data subsequent to a position in the video data corresponding to the position of the one second still picture selected by the user, and then displaying the loaded video data.

2. The video retrieving method according to claim 1, further comprising the step of:

loading, from said storage medium, the video data to a position in the video data corresponding to the position of another still picture which follows said one still picture.

3. The video retrieving method according to claim 1, wherein said first picture data is a still picture included in each of the plurality of videos.

4. The video retrieving method according to claim 1, wherein said first picture data is at least a portion of data included in each of the plurality of videos.

5. The video retrieving method according to claim 1, wherein still picture data immediately after a scene change in the video data is used as the second still picture data.

6. A video retrieving apparatus comprising:

means for storing video data in a storage medium;

means for storing first picture data representative of said video data, a plurality of second still picture data using a portion of pictures composing the video data in said storage medium, and positional information indicative of a plurality of positions corresponding to a position of a cache of said plurality of second still picture data in the video data;

means for inputting a video retrieval request from a user;

means for loading the first picture data from said storage means and displaying the loaded first picture data;

means for inputting a designation of one of the displayed first picture data by the user;

means for loading from said storage medium second still picture data corresponding to the first picture data designated by the user, and displaying the loaded second still picture data;

means for displaying the loaded first picture data and the loaded second still picture data on one screen;

means for inputting a designation of one of the displayed second still picture data by the user; and means for loading from said storage medium video data subsequent to a position in the video data corresponding to the one of the second still picture data designated by the user, and then displaying the loaded video data.

7. The video retrieving apparatus according to claim 6, further comprising means to extract, as the second still picture data, still picture data occurring immediately after a scene change in the video data.

8. The video retrieving apparatus according to claim 7, further comprising means for storing character information regarding the stored video data.

9. A video retrieving method in a system having a plurality of videos stored in a storage medium, said method comprising the steps of:

storing, in addition to video data corresponding to the videos stored in said storage medium, character information relative to the video data, first picture data representative of said video data, a plurality of second still picture data using a portion of pictures composing the video data in said storage medium, and positional information indicative of a position of a cache of said plurality of second still picture data in the video data;

in response to a video retrieval request including character information from a user, comparing the video retrieval request with the character information of the video data and making a decision specifying at least relevant video data satisfying the request;

loading from said storage medium first picture data corresponding to said specified video data, and displaying the loaded first picture data;

loading from said storage medium second still picture data corresponding to the first picture data loaded from the storage medium, and displaying the loaded second still picture data;

displaying the loaded first picture data and the loaded second still picture data on one screen; and loading from said storage medium video data subsequent to a position in the video data corresponding to the second still picture data designated by the user, and then displaying the loaded video data.

10. The video retrieving method according to claim 9, further comprising the step of:

loading, from said storage medium, the video data existing within a range from the position corresponding to the second still picture data designated by the user to the position immediately before a subsequent position in the video data corresponding to another still picture data, and then displaying the loaded data.

11. The video retrieving method according to claim 10, wherein a still picture is used as the first picture data for each of the plurality of videos.

12. The video retrieving method according to claim 11 wherein at least a portion of the video data is used as the first picture data.

13. The video retrieving method according to claim 9, wherein a still picture is used as the first picture data for each of the plurality of videos.

14. The video retrieving method according to claim 9, wherein at least a portion of the video data is used as the first picture data.

15. The video retrieving method according to claim 9, wherein still picture data immediately after a scene change in the video data is used as the second still picture data.

* * * * *